Figure 1:
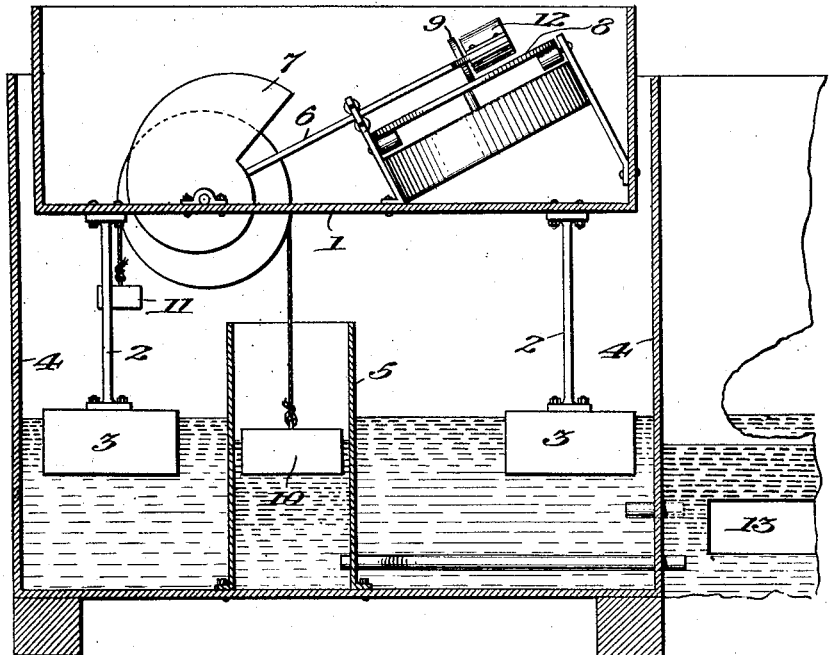

F. W. HANNA.
SELF REGISTERING WATER METER.
APPLICATION FILED AUG. 22, 1912.

1,103,410.

Patented July 14, 1914.

Witnesses:

Inventor:
Frank W. Hanna.

---

UNITED STATES PATENT OFFICE.

FRANK W. HANNA, OF DEFIANCE, IOWA.

SELF-REGISTERING WATER-METER.

1,103,410. Specification of Letters Patent. Patented July 14, 1914.

Application filed August 22, 1912. Serial No. 716,485.

*To all whom it may concern:*

Be it known that I, FRANK W. HANNA, a citizen of the United States, residing at Defiance, in the county of Shelby and State of Iowa, have invented a new and useful Improvement in Self-Registering Water-Meters, of which the following is a specification.

The invention relates to an improvement in my previous invention of self-registering water meters for which I have received Letters Patent No. 946,128. This previous invention is adapted to the measurement of water through a submerged orifice and to the keeping of cumulative discharge registers thereof in water channels, such as canals, rivers and reservoir outlets, and consists essentially of floats actuated by the fluctuating elevations of water in the channel on the upstream and downstream sides of the orifice, a cam wheel with computed portions of its successive radius vectors proportional to corresponding successive discharges through the orifice for heads thereon from zero to a suitable upper limit, a mechanical integrator with a registering device and a driving mechanism suitably connected for effecting the desired register. The mechanical integrator may be either of the plate or of any other suitable drive type. In the plate mechanical integrator type of meter the computed portions of the radius vectors of the cam wheel are the whole vectors less a constant fixed radius.

The improvement consists: (1) in the use of floats for supporting the meter box and its contents on the water surface on the upstream side of the orifice when the meter box is applied to the measurement of water flowing through a submerged orifice thereby doing away with the necessity of a second float operating on the cam wheel and of the mechanism for adjusting the position of the meter box and its contents to accommodate simultaneous fluctuations in the water surfaces on the upstream side of and on the downstream side of the orifice; (2) in the placing of the mechanical integrator arm in direct contact with the cam wheel thereby doing away with the need of a sliding bar or other arrangement for transmitting motion from the cam wheel to the mechanical integrator arm; (3) in the mounting of the mechanical integrator on an inclined plane so as to hold by its own weight the mechanical integrator arm in contact with the cam wheel; (4) in the use of a plate mechanical integrator of new design for effecting the register of the water measurements, in which the registering wheel has its axis of rotation perpendicular to and lying in the same fixed plane with the axis of rotation of the motor driven plate and parallel to the line of motion of the integrator arm.

Figure 2:
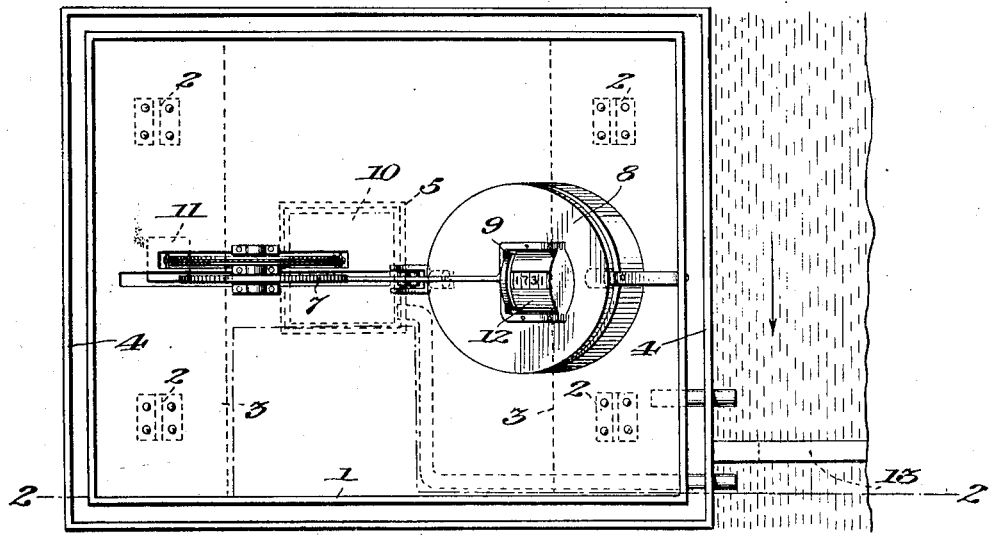

In the accompanying drawing illustrating the invention, Figure 1 shows a sectional elevation on broken plane 2—2 of Fig. 2 and Fig. 2 a plan of the invention applied to a submerged orifice when a plate mechanical integrator with a slidable arm is used and when the meter box is floated on the upstream side of the submerged orifice. The meter box may with equal facility be floated on the water surface on the downstream side of the orifice and the control float on the water surface on the upstream side of the orifice.

In Figs. 1 and 2 the base 1 of the meter box rests by means of the supports 2 on the floats 3 in the chamber 4 on the water surface on the upstream side of the submerged orifice 13; the integrator arm 6 rests in direct contact with the cam wheel 7; the plane surface 8 of the integrator is mounted on an inclined plane giving a sloping position to the integrator arm 6; the registering wheel 9 operating the registering device 12 rests on the driving plane surface 8 and is moved back and forth thereon by the integrator arm 6 through exertions of the cam wheel 7 controlled by the float 10 and the counterweight 11, the float 10 being actuated by the water surface on the downstream side of the submerged orifice 13.

In Figs. 1 and 2, the meter is shown in operation when a small discharge is passing through the submerged orifice. At the time of installation adjustments are made by changing the length of the tape attached to the control float so that zero discharge of the orifice and zero registration of the registering mechanism are coincident.

Having described my invention, I make the following claims:

1. Means for registering the quantitative discharge of water through a submerged orifice consisting essentially of a registering means; means whereby the same is floated and controlled by the level of the water on one side of the orifice; and means for operating the registering means and including a float controlled by the level of the water on the other side of the orifice.

2. Means for registering the quantitative discharge of water through a submerged orifice in a partition wall in a channel or reservoir consisting essentially of a registering means; means whereby the same is floated and controlled by the level of the water on one side of the partition wall; and means for operating the registering means and including a float controlled by the level of the water on the other side of the partition wall.

3. Means for registering the quantitative discharge of water through a submerged orifice consisting essentially of a mechanical integrator with a motor driven surface, a registering wheel, a register and an arm; means whereby the same is floated and controlled by the level of the water on one side of the orifice; and means including a cam wheel and a float for operating the cam wheel and controlled by the level of the water on the other side of the orifice.

4. Means for registering the quantitative discharge of water through a submerged orifice consisting essentially of a mechanical integrator with a clock-driven plane surface, an arm movable in a straight line, a registering wheel mounted on the said arm and driven by the said surface, a register mounted on the said arm and driven by the said wheel; means whereby the same is floated and controlled by the level of the water on one side of the orifice; means, including a cam wheel for moving the said arm and a float for operating the said cam wheel and controlled by the level of the water on the other side of the orifice.

FRANK W. HANNA.

Witnesses:
A. L. VAN ARSDOL,
JAS. S. HANNA.